(12) United States Patent
Shimizu et al.

(10) Patent No.: US 7,663,477 B2
(45) Date of Patent: Feb. 16, 2010

(54) TURN SIGNAL CONTROL DEVICE FOR VEHICLE

(75) Inventors: Kazuma Shimizu, Saitama (JP); Takashi Nakamura, Saitama (JP); Tsutomu Tozuka, Saitama (JP); Yoshiaki Takeuchi, Saitama (JP)

(73) Assignees: Toyo Denso Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 236 days.

(21) Appl. No.: 12/000,002

(22) Filed: Dec. 6, 2007

(65) Prior Publication Data

US 2008/0164991 A1  Jul. 10, 2008

(30) Foreign Application Priority Data

Dec. 28, 2006  (JP)  ............................. 2006-356223

(51) Int. Cl.
*B60Q 1/40* (2006.01)

(52) U.S. Cl. ...................... 340/476; 340/475; 200/61.27

(58) Field of Classification Search ................. 340/476, 340/475, 477, 478, 471, 468; 200/61.27, 200/61.28, 61.3–61.38, 327, 6 R
See application file for complete search history.

(56) References Cited

U.S. PATENT DOCUMENTS

RE28,479 E * 7/1975 Suzuki et al. ............... 340/471
4,058,797 A   11/1977 Sekiguchi et al.
4,962,366 A   10/1990 Hatanaka et al.
5,739,751 A * 4/1998 Ishihara et al. .............. 340/475
6,587,045 B2 * 7/2003 Sano .......................... 340/476

FOREIGN PATENT DOCUMENTS

| JP | 59 230836 | 12/1984 |
|----|-----------|---------|
| JP | 64-4601   | 2/1989  |
| JP | 2004 220919 | 8/2004 |

* cited by examiner

*Primary Examiner*—Toan N Pham
(74) *Attorney, Agent, or Firm*—Arent Fox LLP

(57) ABSTRACT

In a turn signal control device for a vehicle having an automatic canceling function, a switch operating element is carried on a pivot shaft mounted in a fixed switch case so that the switch operating element can be returned and pushed-in between a returned position and a pushed-in position. The switch operating element is swingable at the returned position between a neutral position and a left-turn indicating position and a right-turn indicating position. The switch operating element is pushed-in to the pushed-in position by push-in operation at the returned position. The switch operating element is resiliently urged toward the neutral position and there turned position. A winker switch is operatively connected to the switch operating element so as to break the connection of a left-turn indicating means or a right-turn indicating means to a flasher unit in response to push-in of the switch operating element to the pushed-in position. Thus, a switch and an electric circuit for manual canceling are not required to improve reliability.

5 Claims, 14 Drawing Sheets

(NEUTRAL POSITION)

FIG.11 (LEFT-TURN (RIGHT-TURN) INDICATING POSITION)

(PUSHED POSITION)

TURN SIGNAL CONTROL DEVICE FOR VEHICLE

BACKGROUND OF THE INVENTION

1. Field of the Invention

The present invention relates to a turn signal control device for a vehicle, and particularly relates to a turn signal control device for a vehicle comprising: a flasher unit for repeatedly performing connection and disconnection in response to input of a setting signal, and maintaining a disconnected state in response to input of a cancel signal; a left-turn indicating means and a right-turn indicating means which are activated by electricity supply thereto to indicate a left-turned state and a right-turned state, respectively; a turn signal switch means including: a switch operating element swingable between a neutral position, and a left-turn indicating position and a right-turn indicating position which are provided on opposite sides of the neutral position; a winker switch for connecting the left-turn indicating means or the right-turn indicating means to the flasher unit in response to swing of the switch operating element from the neutral position to the left-turn or right-turn indicating position; and a set switch for changing switching modes in response to the swing of the switch operating means from the neutral position to the left-turn or right-turn indicating position; and a control unit which inputs the cancel signal to the flasher unit in response to establishment of a predetermined automatic canceling condition, and which inputs the setting signal to the flasher unit in response to change of the switching modes of the set switch corresponding to the swing of the switch operating element.

2. Description of the Related Art

Such a turn signal control device for a vehicle is already known, for example, from Japanese Utility Model Publication No. 64-4601. In this turn signal control device, in order to provide a winker-canceled state by a manual operation after swing of a switch operating element to a left-turn indication position or a right-turn indicating position, a switch for changing switching modes in response to push-in of the switch operating element is provided in a turn signal switch means.

The above conventional device requires a switch for providing the winker-canceled state by the manual operation is required in addition to a set switch, and also an electric circuit for manual canceling. However, in order to further improve the reliability, it is desirable to simplify the electric circuit.

SUMMARY OF THE INVENTION

The present invention has been achieved in view of such circumstances, and an object thereof is to provide a turn signal control device for a vehicle, wherein a switch and an electric circuit for manual canceling are not required to improve reliability.

To achieve the above-mentioned object, according to a first feature of the invention, there is provided a turn signal control device for a vehicle comprising: a flasher unit for repeatedly performing connection and disconnection in response to input of a setting signal, and maintaining a disconnected state in response to input of a cancel signal; a left-turn indicating means and a right-turn indicating means which are activated by electricity supply thereto to indicate a left-turned state and a right-turned state, respectively; a turn signal switch means including: a switch operating element swingable between a neutral position, and a left-turn indicating position and a right-turn indicating position which are provided on opposite sides of the neutral position; a winker switch for connecting the left-turn indicating means or the right-turn indicating means to the flasher unit in response to swing of the switch operating element from the neutral position to the left-turn or right-turn indicating position; and a set switch for changing switching modes in response to the swing of the switch operating means from the neutral position to the left-turn or right-turn indicating position; and a control unit which inputs the cancel signal to the flasher unit in response to establishment of a predetermined automatic canceling condition, and which inputs the setting signal to the flasher unit in response to change of the switching modes of the set switch corresponding to the swing of the switch operating element, wherein the switch operating element is carried on a pivot shaft mounted in a fixed switch case so that the switch operating element can be returned and pushed-in between a returned position and a pushed-in position, the switch operating element being swingable at the returned position between the neutral position and the left-turn indicating position and the right-turn indicating position, the switch operating element being pushed-in to the pushed-in position by push-in operation at the returned position; wherein a resiliently urging means is mounted between the switch case and the switch operating element so as to resiliently urge the switch operating element toward the neutral position and the returned position; and wherein the winker switch is operatively connected to the switch operating element so as to break the connection of the left-turn indicating means or the right-turn indicating means to the flasher unit in response to push-in of the switch operating element to the pushed-in position.

With the first feature of the present invention, to provide a winker-canceled state by a manual operation after the winker switch has been operated so as to connect the left-turn indicting means or the right-turn indicating means to the flasher unit by swinging the switch operating element in the returned position toward the left-turn indicating position or the right-turn indicating position, the switch operating element is pushed-in from the returned position to the pushed-in position. With this operation, the winker switch, in a state in which the left-turn indicting means or the right-turn indicating means is connected to the flasher unit, is operated to break the connection of the left-turn indicting means or the right-turn indicating means to the flasher unit, thereby providing the winker-canceled state. Therefore, a switch and an electric circuit for manual canceling are not required to improve the reliability.

According to a second feature of the present invention, in addition to the first feature, the resiliently urging means and the winker switch are disposed within the switch case with the switch operating element sandwiched therebetween.

With the second feature of the present invention, the resiliently urging means and the winker switch are disposed on the opposite sides of the switch operating element. Therefore, it is possible to reduce the length of the entire switch case in directions of push-in and return of the switch operating element. Also, the position of the switch operating element can be changed by disposing the resiliently urging means and the winker switch on which side of the switch operating element. Therefore, it is possible to increase the degree of freedom in disposing the operating portion of the switch operating element.

According to a third feature of the present invention, in addition to the first or second feature, the switch operating element includes a first pin protruding from one surface of the switch operating element, and a second pin protruding from the other surface of the switch operating element at a position spaced away from the pivot shaft more than the first pin; and the resiliently urging means is arranged on one side of the switch operating element so as to apply a resilient force to the first pin so that the first pin urges the switch operating element to the neutral position and the returned position; and a movable contact holder having a plurality of movable contacts and constituting a portion of the winker switch is operatively connected to the second pin so that the movable contact holder can slide between a left-turn indicating/connecting position, a right-turn indicating/connecting position and a disconnecting position, the left-turn indicating means being connected to the flasher unit at the left-turn indicating/connecting position in response to the swing of the switch operating element to the left-turn indicating position, the right-turn indicating means being connected to the flasher unit at the right-turn indicating/connecting position in response to the swing of the switch operating element to the right-turn indicating position, the disconnecting position being provided at a central portion between the left-turn indicating/connecting position and the right-turn indicating/connecting position so that the movable contact holder can break the connection of the left-turn indicating means or the right-turn indicating means to the flasher unit in response to the push-in of the switch operating element after the swing of the switch operating element to the left-turn or right-turn indicating position.

With the third feature of the present invention, the distance between the second pin operatively connected to the movable contact holder of the winker switch and the pivot shaft is relatively increased, and the amount of sliding of the movable contact holder due to the swing of the switch operating element is relatively increased, thereby securing a sufficient insulating space between the contacts of the winker switch. Also, the resiliently urging means apply a resiliently urging force to the first pin having a relatively large distance from the pivot shaft, thereby reducing a space required for the resiliently urging means in the push-in and return directions, and increasing the degree of freedom in setting the operating load.

According to a fourth feature of the present invention, in addition to the third feature, the resiliently urging means includes a return plate that has a guide recess into which the first pin is inserted and that is supported in the switch case so that the return plate can slide in a direction parallel to directions of push-in and return of the switch operating element, and a pair of return springs mounted between the return plate and the switch case so as to exhibit spring forces for urging the return plate in a direction to bring the first pin into abutment against the guide recess; the guide recess is formed into a substantially triangular shape having a valley against which the first pin abuts in a state in which the switch operating element is in the neutral position, and return cam faces provided on opposite sides of the valley and inclined so that the first pin is brought into abutment against the return cam faces in response to the swing of the switch operating element to the left-turn and right-turn indicating positions; and the return springs are mounted between the return plate and the switch case on the opposite sides of the valley.

With the fourth feature of the present invention, the pair of return springs are mounted between the return plate and the switch case. The return springs are adapted to bring the first pin provided on the switch operating element into abutment against the valley of the guide recess, when the switch operating element is in the neutral position; to exhibit spring forces for urging the pin abutting against one of the return cam faces provided on the opposite sides of the valley in a direction to return the pin to the valley, i.e., in a direction to return the switch operating element to the neutral position, when the switch operating element is swung to the left-turn or right-turn indicating position; and to exhibit spring forces for urging the switch operating element toward the returned position, when the switch operating element is pushed-in to the pushed-in position. Because the return plate and the pair of return springs are disposed in parallel to the switch operating element, it is possible to reduce the length of the entire switch case in the directions of push-in and return of the switch operating element. Also, because the pair of return springs exhibit the spring forces from the opposite sides to return the switch operating element to the returned position, it is possible to inhibit the switch operating element from staggering during operation thereof, leading to an improved operational feeling.

According to a fifth feature of the present invention, in addition to the fourth feature, the guide recess is formed so that an amount of stroke of the return plate upon the swing of the switch operating element in the returned position from the neutral position to the left-turn indicating position or the right-turn indicating position is larger than an amount of stroke of the return plate upon the push-in of the switch operating element from the returned position to the pushed-in position; and the set switch includes a stationary contact fixedly disposed on a side of the switch case and a movable contact disposed on the return plate, the movable contact being brought into contact and electrical connection with the stationary contact upon the swing of the switch operating element in the returned position from the neutral position to the left-turn or right-turn indicating position, while the movable contact are not brought into contact with the stationary contact upon the push-in of the switch operating element from the returned position to the pushed-in position.

With the fifth feature of the present invention, it is possible to construct the set switch so as to provide electrical connection in response to the swing of the switch operating element from the neutral position to the left-turn or right-turn indicating position, by utilizing a difference between the amount of stroke of the return plate upon the push-in of the switch operating element from the returned position to the pushed-in position and the amount of stroke of the return plate upon the swing of the switch operating element to the left-turn indicating position or the right-turn indicating position. Therefore, the set switch is constructed by using, as a portion thereof, the return plate constituting a portion of the resiliently urging means, thereby reducing the number of parts.

The above and other objects, features and advantages of the invention will become apparent from the following description of the preferred embodiments taken in conjunction with the accompanying drawings.

DETAILED DESCRIPTION OF THE PREFERRED EMBODIMENTS

Figure 1:
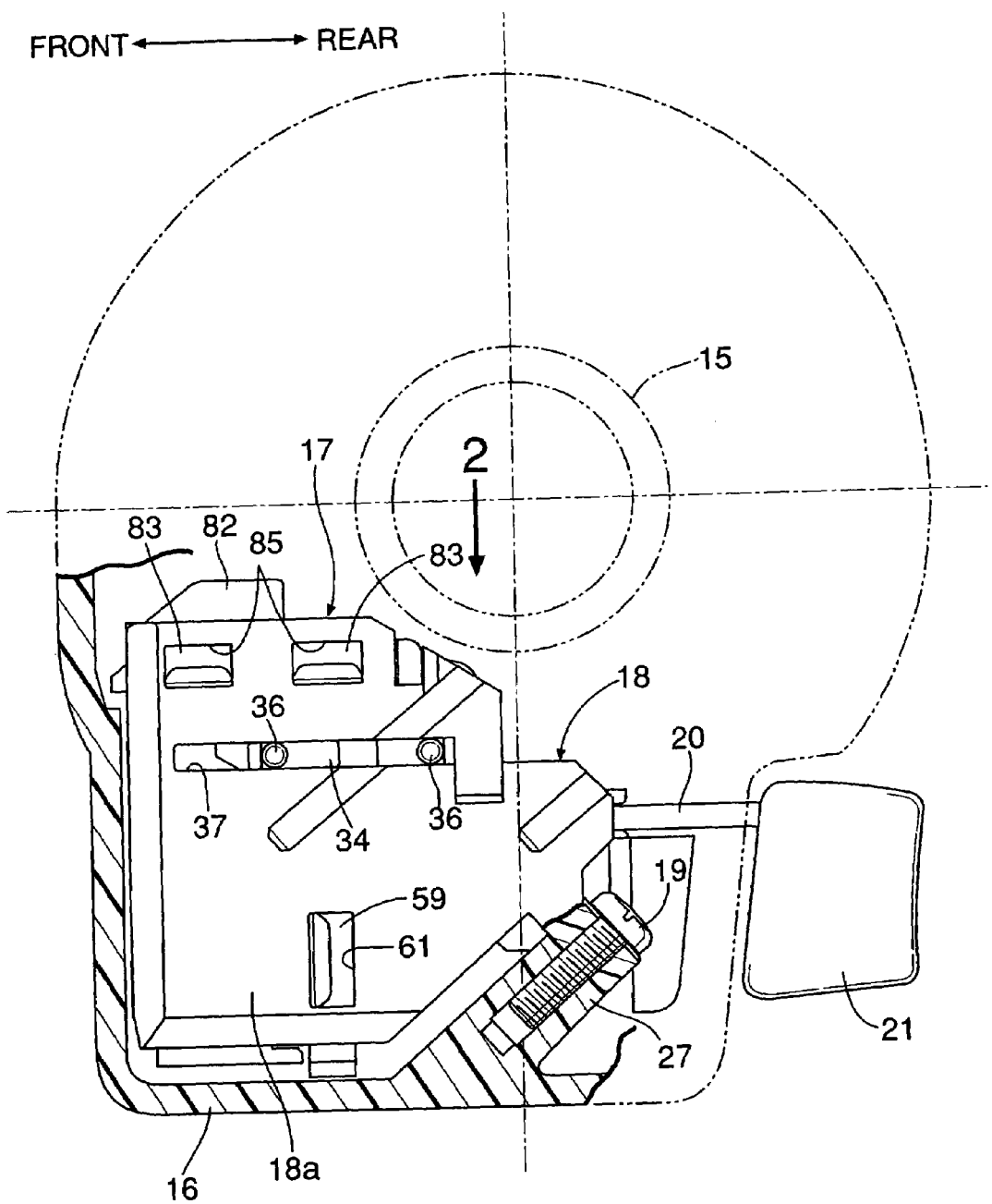
FIG. 1 is a side view of a turn signal switch means according to a first embodiment of the present invention.
Figure 2:
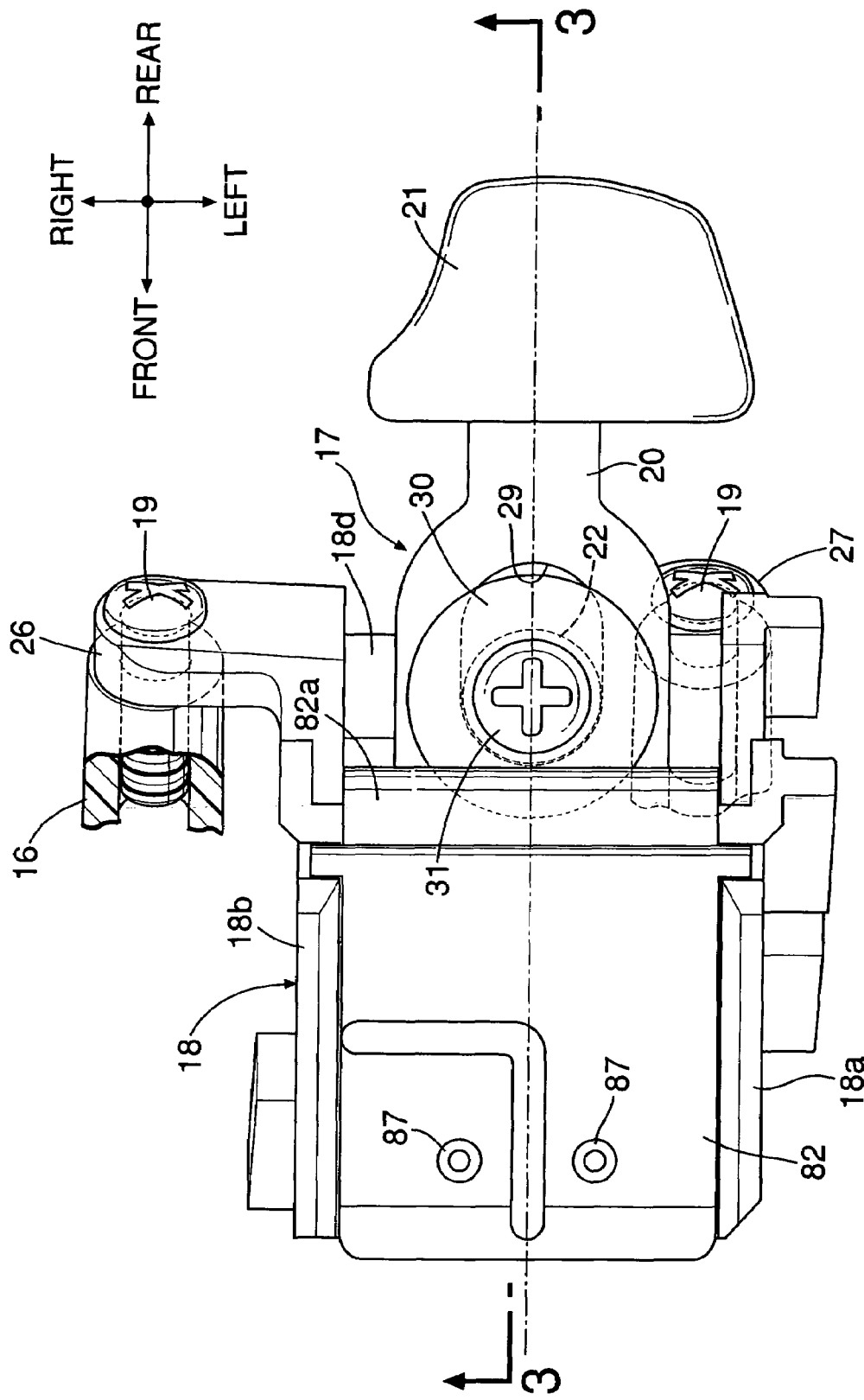
FIG. 2 is a view taken in a direction of an arrow 2 in FIG. 1.

Referring first to FIG. 1, a grip (not shown) adapted to be grabbed by a left hand of a rider is mounted at a left end of a steering handlebar, for example, of a motorcycle, and a synthetic resin switch cover 16 is attached to the steering handlebar 15 at a position adjoining the grip from inside. The switch cover 16 comprises two members sandwiching the steering handlebar 15 from opposite sides.

A switch case 18 for a turn signal switch means 17 is housed in the switch cover 16 and fastened to the switch cover 16, for example, by a pair of screw members 19. The turn signal switch means 17 includes a switch operating element 20 which protrudes rearwards from the switch cover 16. A knob 21 is mounted at a protruding end of the switch operating element 20.

Referring to FIGS. 2 to 10, the turn signal switch means 17 includes: the synthetic resin switch case 18 fastened to the switch cover 16; the switch operating element 20 carried on a pivot shaft 22 provided in the switch case 18; a resiliently urging means 23 mounted between the switch case 18 and the switch operating element 20; and a set switch 25 and a winker switch 24 for changing switching modes in response to the operation of the switch operating element 20.

The switch case 18 integrally comprises: first and second sidewalls 18a and 18b extending vertically within the switch cover 16 while facing each other with a space in a lengthwise direction of the steering handlebar 15 therebetween; a front wall 18c vertically extending and connecting front ends of the first and second sidewalls 18a and 18b to each other at right angles; and a bridging portion 18d connecting rear ends of the first and second sidewalls 18a and 18b to each other at right angles. A mounting portion 26 provided on the second sidewall 18b and amounting portion 27 provided on the bridging portion 18d are fastened to the switch cover 16 by screw members 19, respectively.

The cylindrical pivot shaft 22 protrudes upwards from an upper surface of a central portion of the bridging portion 18d of the switch case 18. A threaded bore 28 (see FIGS. 3 and 4) is provided in the bridging portion 18d, and opened at an upper end of the pivot shaft 22 to extend vertically.

The switch operating element 20 is made of a metal material and partially protrudes into the switch case 18 while coming into sliding contact with an upper surface of the bridging portion 18d. The switch operating element 20 has an elongated bore 29 through which the pivot shaft 22 is inserted; a washer 30 abuts against a tip end of the pivot shaft 22 with the switch operating element 20 sandwiched between the washer 30 and the bridging portion 18d; and a screw member 31 inserted through the washer 30 is threadedly fitted into the threaded bore 28.

The switch operating element 20 is carried on the pivot shaft 22 so that the switch operating element 20 can be returned and pushed-in between a returned position (a rear position shown in FIGS. 3 and 5) and a pushed-in position (a front position shown in FIG. 12) which are spaced away from each other in a direction perpendicular to an axis of the pivot shaft 22, and so that the switch operating element 20 is swingable at the returned position between the neutral position, and the left-turn indicating position and the right-turn indicating position which are provided on opposite sides of the neutral position. Also, the end of the switch operating element 20 protruding into the switch case 18 is formed to have a width narrowing toward its tip end in order to avoid that the width in a lateral direction of the switch case 18 is increased for accommodation of the swing of the switch operating element 20 between the left-turn indicating position and the right-turn indicating position.

The resiliently urging means 23 is adapted to urge the switch operating element 20 toward the neutral position and the returned position, and includes a return plate 34 supported in the switch case 18, and a pair of return springs 35, 35 mounted between the return plate 34 and the switch case 18.

Figure 6:
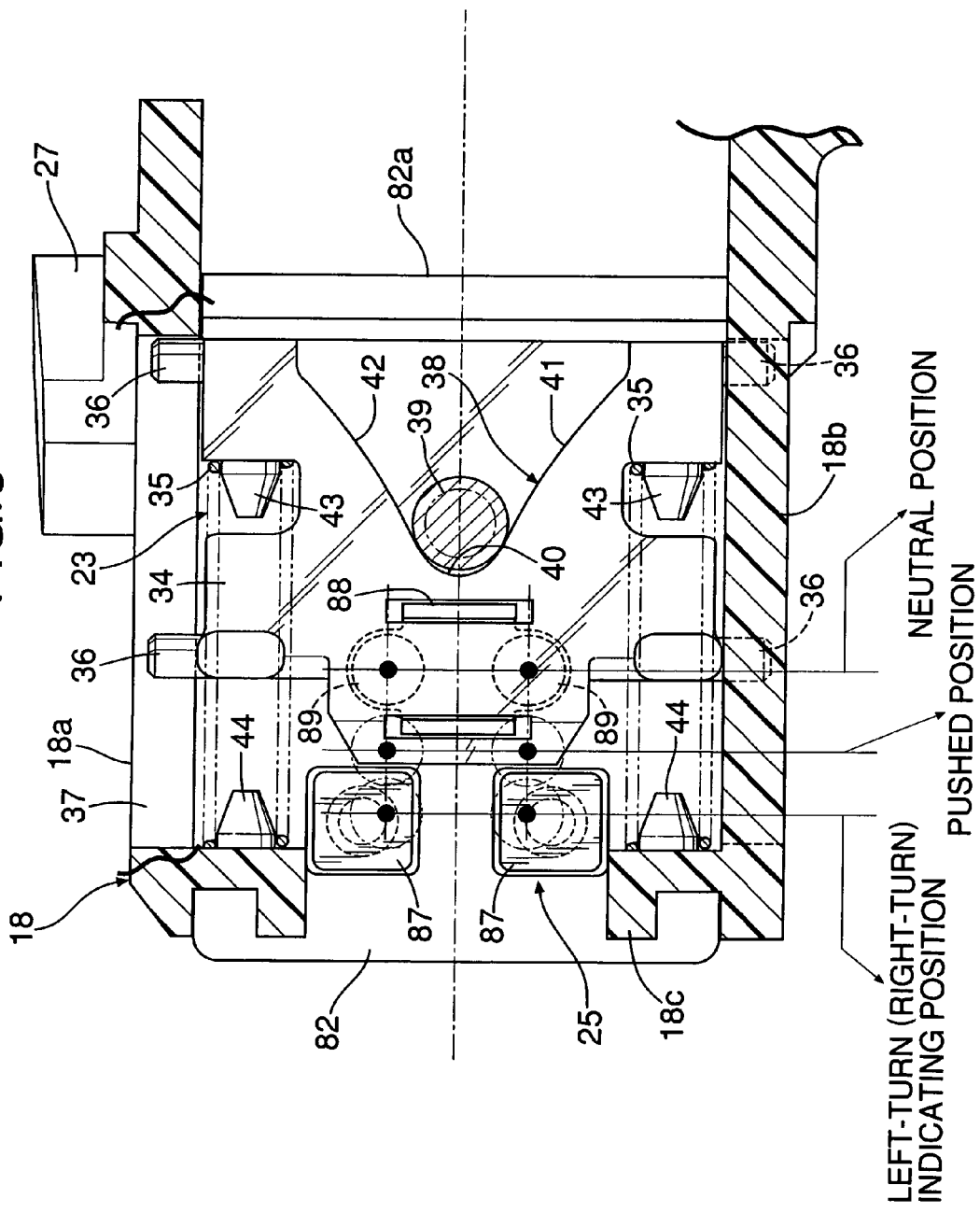
FIG. 6 is an enlarged sectional view taken along a line 6-6 in FIG. 3.
Figure 7:
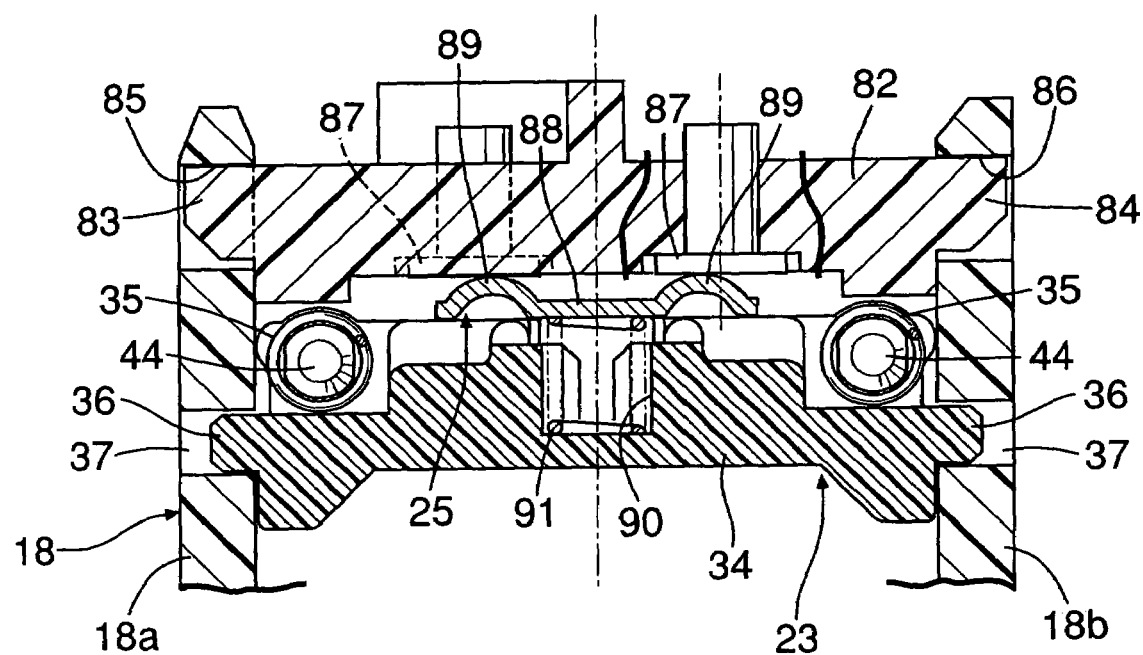
FIG. 7 is an enlarged sectional view taken along a line 7-7 in FIG. 3.

As shown in FIGS. 6 and 7, a pair of guide projections 36, 36 are projectingly provided on each of opposite sides of the return plate 34. Guide bores 37, 37 are provided in the first and second sidewalls 18a and 18b of the switch case 18 on each of opposite sides of the return plate 34 so that the guide projections 36, 36 are slidably fitted into the guide bores 37, 37. The guide bores 37, 37 are formed to extend through a long distance along the directions of push-in and return of the switch operating element 20. The return plate 34 is supported in the switch case 18 so as to be slidable in a direction parallel to the directions of push-in and return of the switch operating element 20.

A guide recess 38 opened toward the pivot shaft 22 is provided on a surface of the return plate 34 which is opposed to the switch operating element 20. A first pin 39 provided on the switch operating element 20 and having an axis parallel to the pivot shaft 22 is inserted into the guide recess 38. Also, the guide recess 38 is recessed substantially into a triangular shape having a valley 40 against which the first pin 39 abuts in a state in which the switch operating element 20 is in the neutral position, and a pair of return cam faces 41 and 42 disposed on opposite sides of the valley 40 and inclined so that the first pin 39 is brought into abutment against the return cam faces 41, 42 in response to the swing of the switch operating element 20 to the left-turn indicating position and the right-turn indicating position.

The return springs 35 are coil springs mounted on opposite sides of the valley 40 between the return plate 34 and the front wall 18c of the switch case 18, and provided under compression between the opposite sides of the return plate 34 and the front wall 18c of the switch case 18. Projections 43, 43 and 44, 44 are projectingly provided on the opposite sides of the return plate 34 and the front wall 18c of the switch case 18, respectively, so that they are fitted into opposite ends of the return springs 35.

Figure 5:
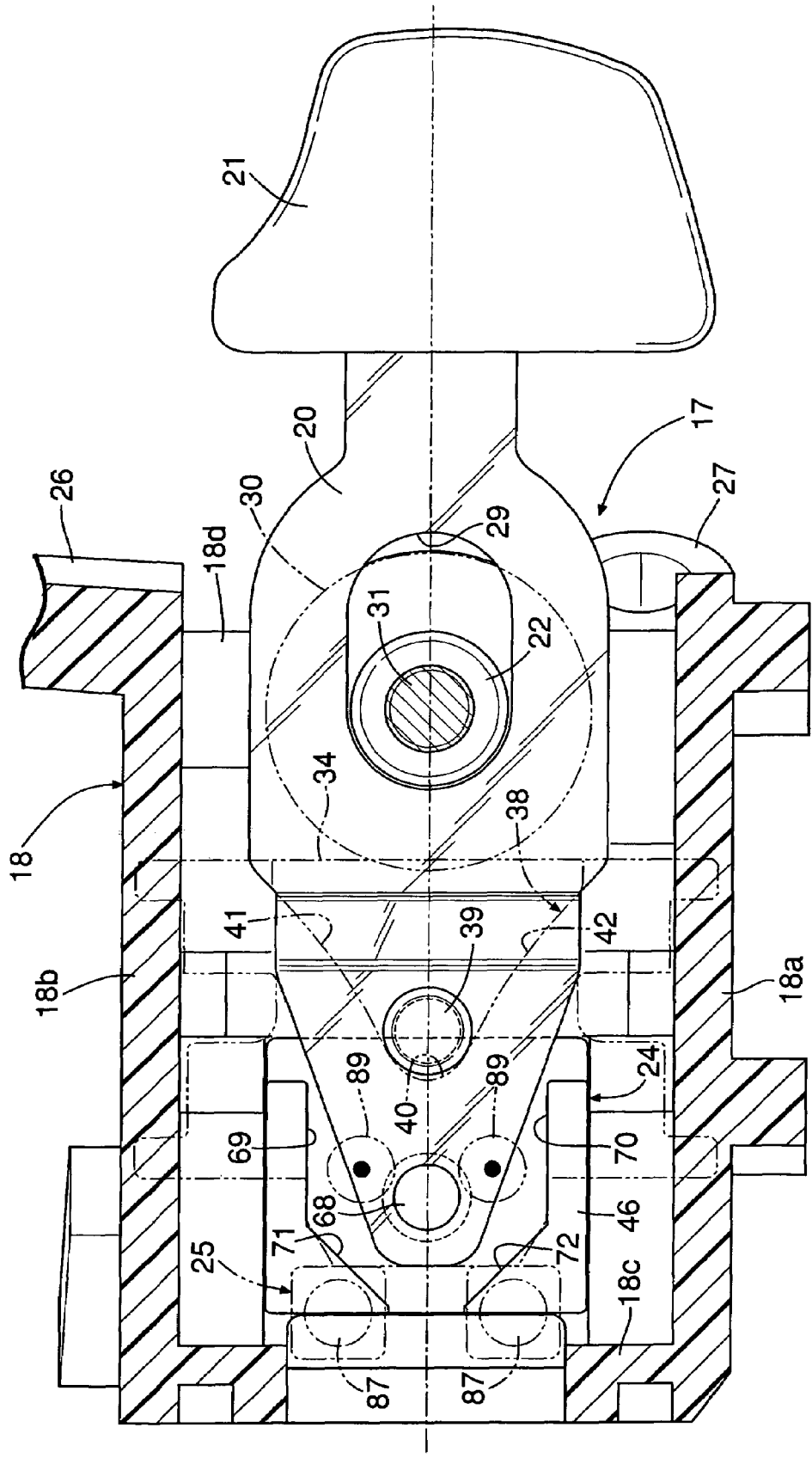
FIG. 5 is an enlarged sectional view taken along a line 5-5 in FIG. 3.
Figure 11:
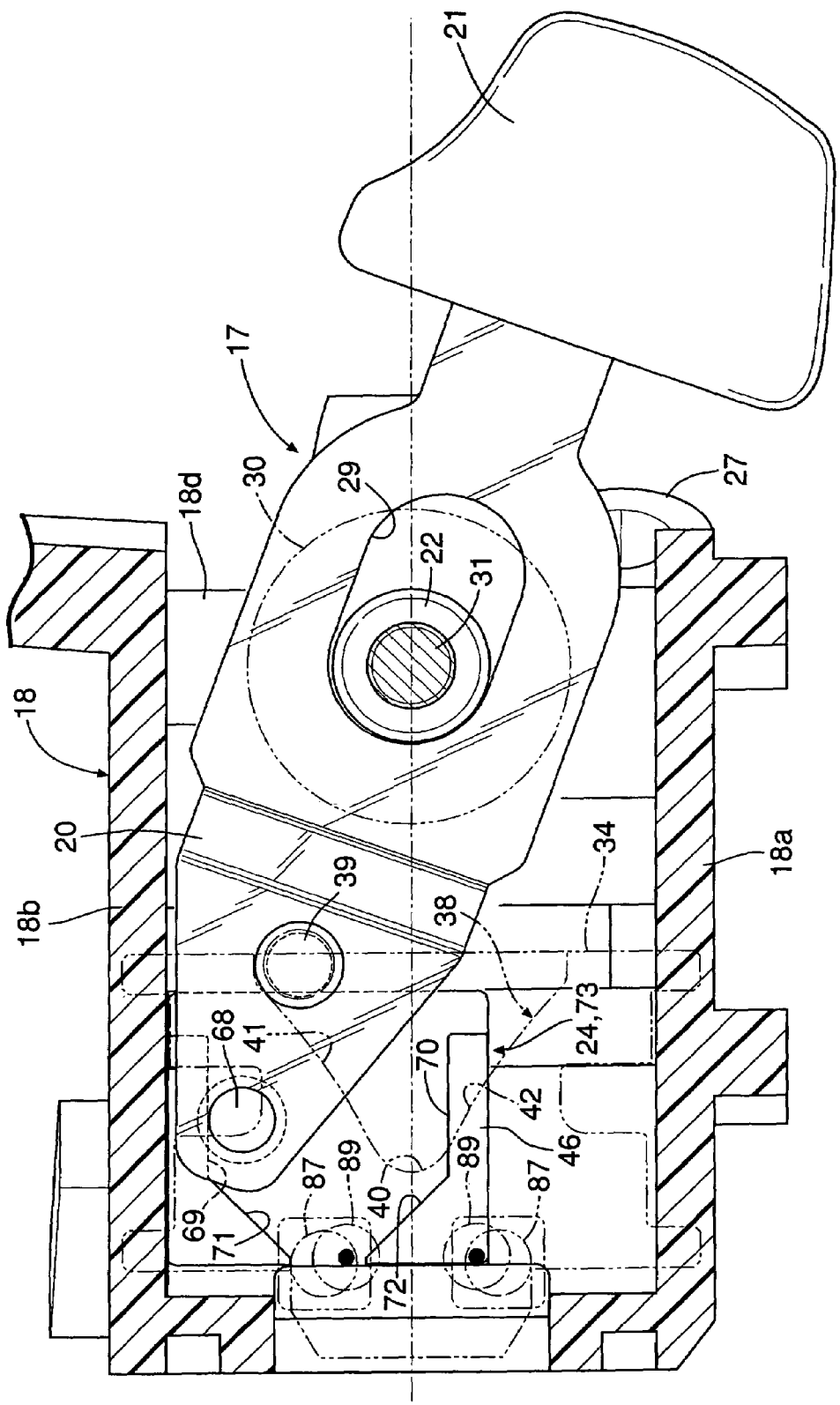
FIG. 11 is a view similar to FIG. 5 but when the switch operating element is operated to a left-turn indicating position.

With this resiliently urging means 23 in a state in which the switch operating element 20 is in the neutral position, the valley 40 of the guide recess 38 is brought into abutment against the first pin 39 by spring forces exhibited by the return springs 35, as shown in FIG. 6, whereby the switch operating element 20 is resiliently urged toward the returned position. As shown in FIG. 11, when the switch operating element 20 is swung to the left-turn indicating position, the first pin 39 is brought into abutment against one 41 of the return cam faces 41 and 42 on the opposite sides of the valley 40. In this arrangement, because the return cam face 41 is an inclined face, the spring forces exhibited by the return springs 35 act on the first pin 39 through the return plate 34 in a direction to return the first pin 39 to the valley 40, i.e., in a direction to return the switch operating element 20 to the neutral position. When the application of an operating force to the switch operating element 20 is stopped, the switch operating element 20 is returned to the neutral position, as shown in FIGS. 5 and 6. Also, when the switch operating element 20 is swung to the right-turn indicating position, the first pin 39 is brought into abutment against the other 42 of the return cam faces 41 and 42 on the opposite sides of the valley 40. In this arrangement, because the return cam face 42 is an inclined face, the spring forces exhibited by the return springs 35 acts on the first pin 39 through the return plate 34 in a direction to return the first pin 39 to the valley 40. When the application of an operating force to the switch operating element 20 is stopped, the switch operating element 20 is returned to the neutral position.

Figure 12:
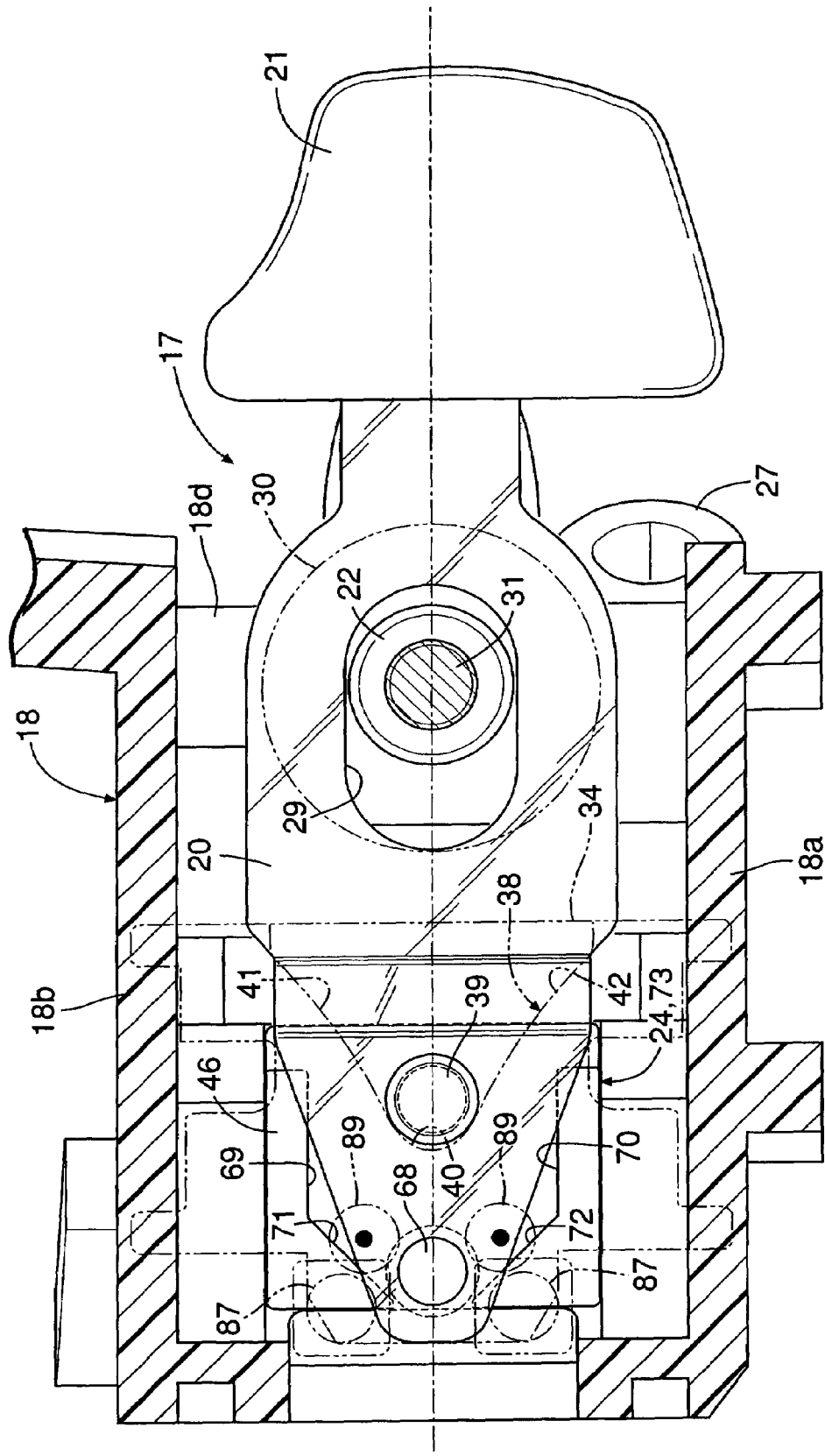
FIG. 12 is a view similar to FIG. 5 but when the switch operating element is pushed-in to a pushed-in position.

When the switch operating element 20 is pushed-in to the pushed-in position, as shown in FIG. 12, the first pin 39 is in abutment against the valley 40 of the guide recess 38, and the resiliently urging means 23 exhibits a spring force for urging the switch operating element 20 toward the returned position through the first pin 39.

Further, the guide recess 38 is formed so that a stroke amount of the return plate 34 when the switch operating element 20 is swung in the returned position from the neutral position to the left-turn indicating position or the right-turn indicating position is larger than a stroke amount of the return plate 34 when the switch operating element 20 is pushed-in from the returned position to the pushed-in position.

Figure 8:
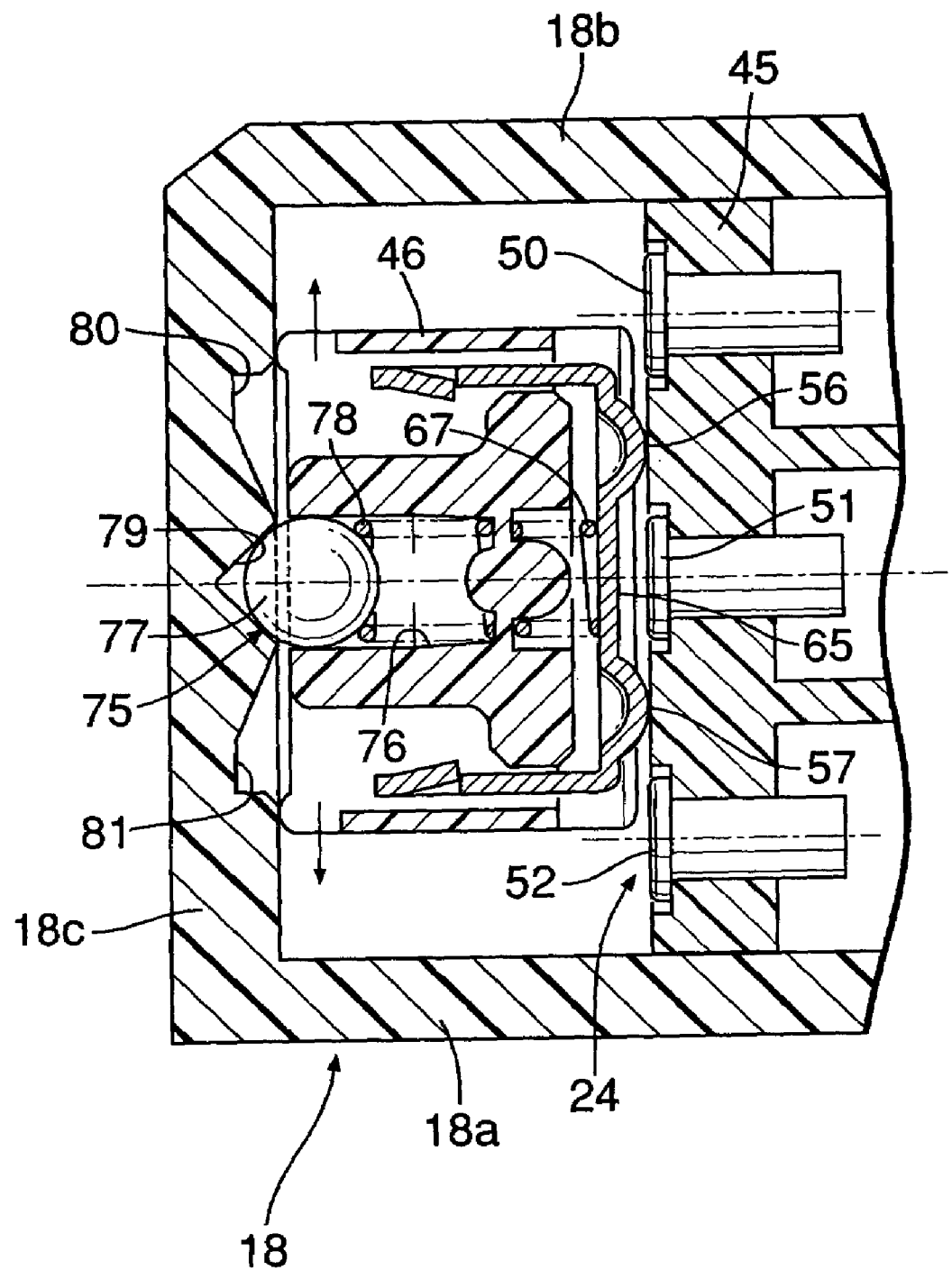
FIG. 8 is an enlarged sectional view taken along a line 8-8 in FIG. 3.
Figure 9:
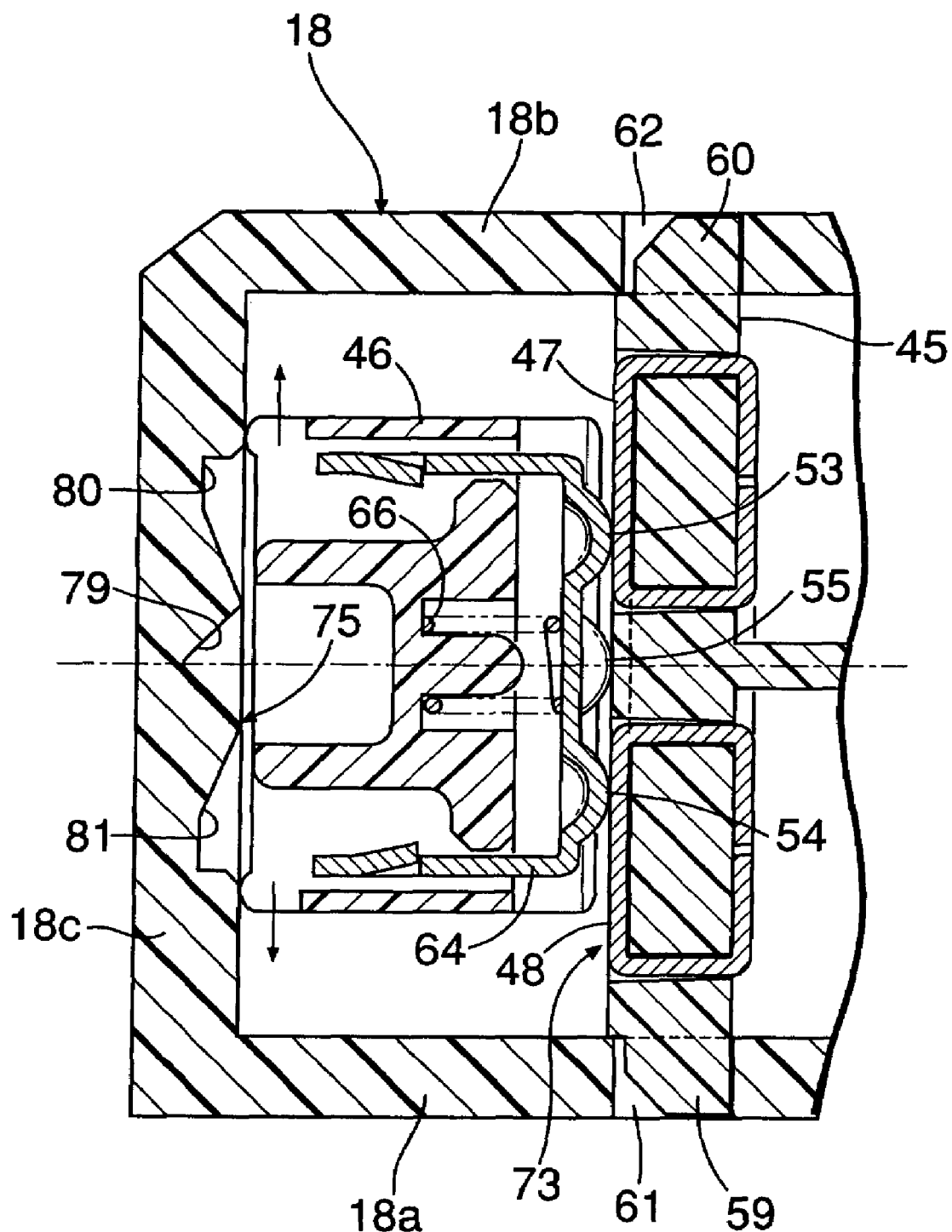
FIG. 9 is a sectional view taken along a line 9-9 in FIG. 3.
Figure 10:
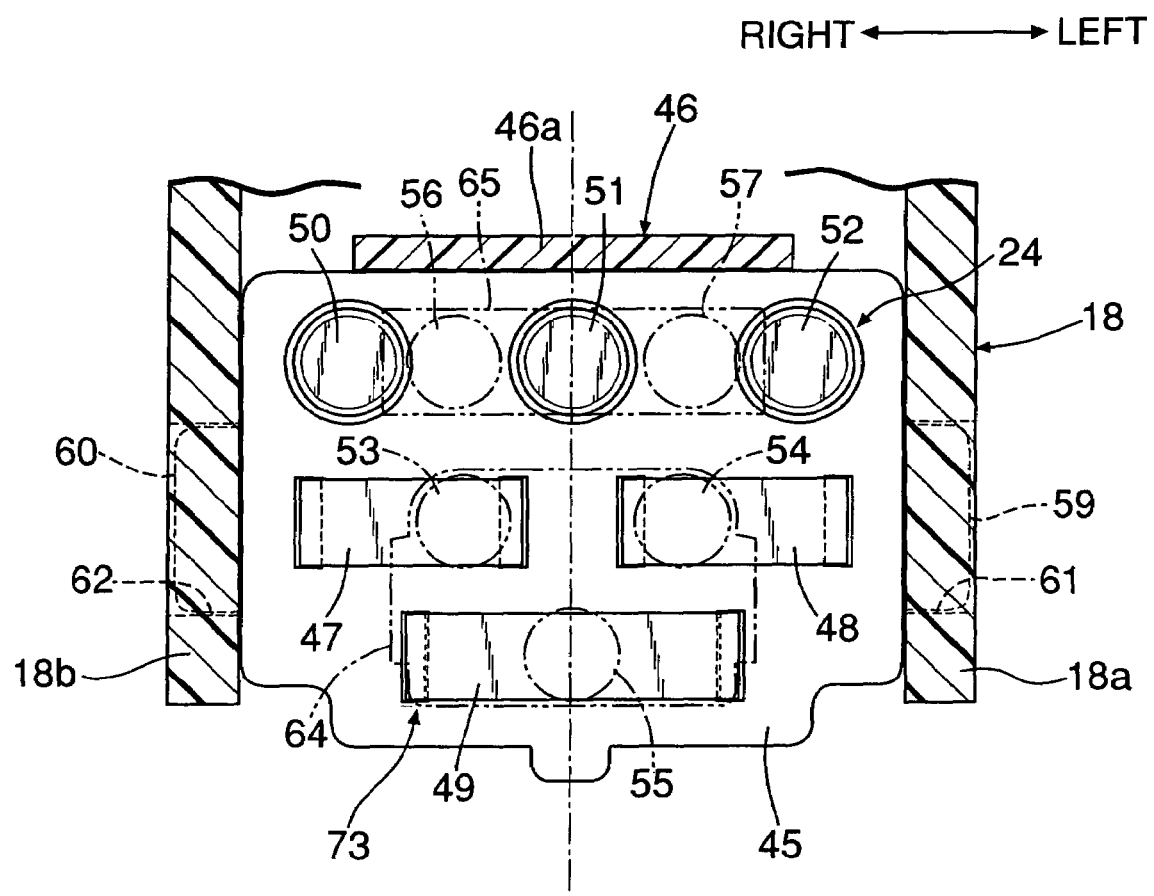
FIG. 10 is a sectional view taken along a line 10-10 in FIG. 3.

Referring particularly carefully to FIGS. 8 to 10, the winker switch 24 includes a first stationary contact base 45 made of a synthetic resin and fixed to the switch case 18, and a movable contact holder 46 opposed to the first stationary contact base 45 and adapted to be slid in response to the operation of the switch operating element 20. The winker switch 24 is disposed within the switch case 18 such that the switch operating element 20 is sandwiched between the winker switch 24 and the resiliently urging means 23.

First to sixth stationary contacts 47 to 52 are mounted on the first stationary contact base 45. First to fifth movable contacts 53 to 57 are mounted on the movable contact holder 46. Specifically, the winker switch 24 comprises the fourth to sixth stationary contacts 50 to 52, and the fourth and fifth movable contacts 56 and 57. The first to third stationary contacts 47 to 49 and the first to third movable contacts 53 to 55 constitute a position switch 73 including the first stationary contact base 45 and the movable contact holder 46 which are shared by the winker switch 24.

The first stationary contact base 45 is disposed at a position spaced away from the front wall 18c of the switch case 18. The first stationary contact base 45 is fixed to the switch case 18 by bringing first and second engaging projections 59 and 60 integrally projectingly provided on opposite sides of the first stationary contact base 45 into resilient engagement with first and second locking bores 61 and 62 provided in the first and second sidewalls 18a and 18b of the switch case 18, respectively. A slit 63 (see FIG. 4) is provided in the second sidewall 18b at a position adjacent to the second locking bore 62 so that the slit 63 extends through a long distance along the directions of the push-in and return movements of the switch operating element 20 and opens in a rear end of the second sidewall 18b, in order that the second sidewall 18b can be bent upon resilient engagement of the second engaging projection 60 with the second locking bore 62.

Provided on the side of the front surface of the first stationary contact base 45, i.e., on the side of the front wall 18c of the switch case 18 are the first and second stationary contacts 47 and 48 extending laterally through a long distance and arranged laterally side by side, the third stationary contact 49 extending laterally through a long distance below the first and second stationary contacts 47 and 48, and fourth, fifth and sixth stationary contacts 50, 51 and 52 arranged laterally side by side above the first and second stationary contacts 47 and 48.

On the other hand, the movable contact holder 46 is disposed between the front wall 18c of the switch case 18 and the first stationary contact base 45. Supported on the movable contact holder 64 are a first contact plate 64 corresponding to the first to third stationary contacts 47 to 49, and a second contact plate 65 corresponding to the fourth to sixth stationary contacts 50 to 52 so that they can move toward and away from the first stationary contact base 45. Projectingly provided on a surface of the first contact plate 64 opposed to the first stationary contact base 45 are the first and second movable contacts 53 and 54 capable of being brought into contact and electrical connection with the first and second stationary contacts 47 and 48 respectively, and the third movable contact 55 normally in contact and electrical connection with the third stationary contact 49. Projectingly provided on a surface of the second contact plate 65 opposed to the first stationary contact base 45 are the fourth movable contact 56 capable of being brought into contact and electrical connection with the fourth and fifth stationary contacts 50 and 51 and the fifth movable contact 57 capable of being brought into contact and electrical connection with the fifth and sixth stationary contacts 51 and 52.

Springs 66 and 67 are mounted between the movable contact holder 46 and the first and second contact plates 64 and 65 so as to urge the first and second contact plates 64 and 65 toward the first stationary contact base 45, respectively. The first and second contact plates 64 and 65 are floatingly supported in the movable contact holder 46.

The movable contact holder 46 is slidably carried between the first stationary contact base 45 and the front wall 18c of the switch case 18. The movable contact holder 46 is reciprocally moved between the first and second sidewalls 18a and 18b of the switch case 18 in order to change the electrically connected and disconnected states of the first to fifth movable contacts 53 to 57 to the first to sixth stationary contacts 47 to 52 in response to the swing of the switch operating element 20 in the returned position.

Figure 3:
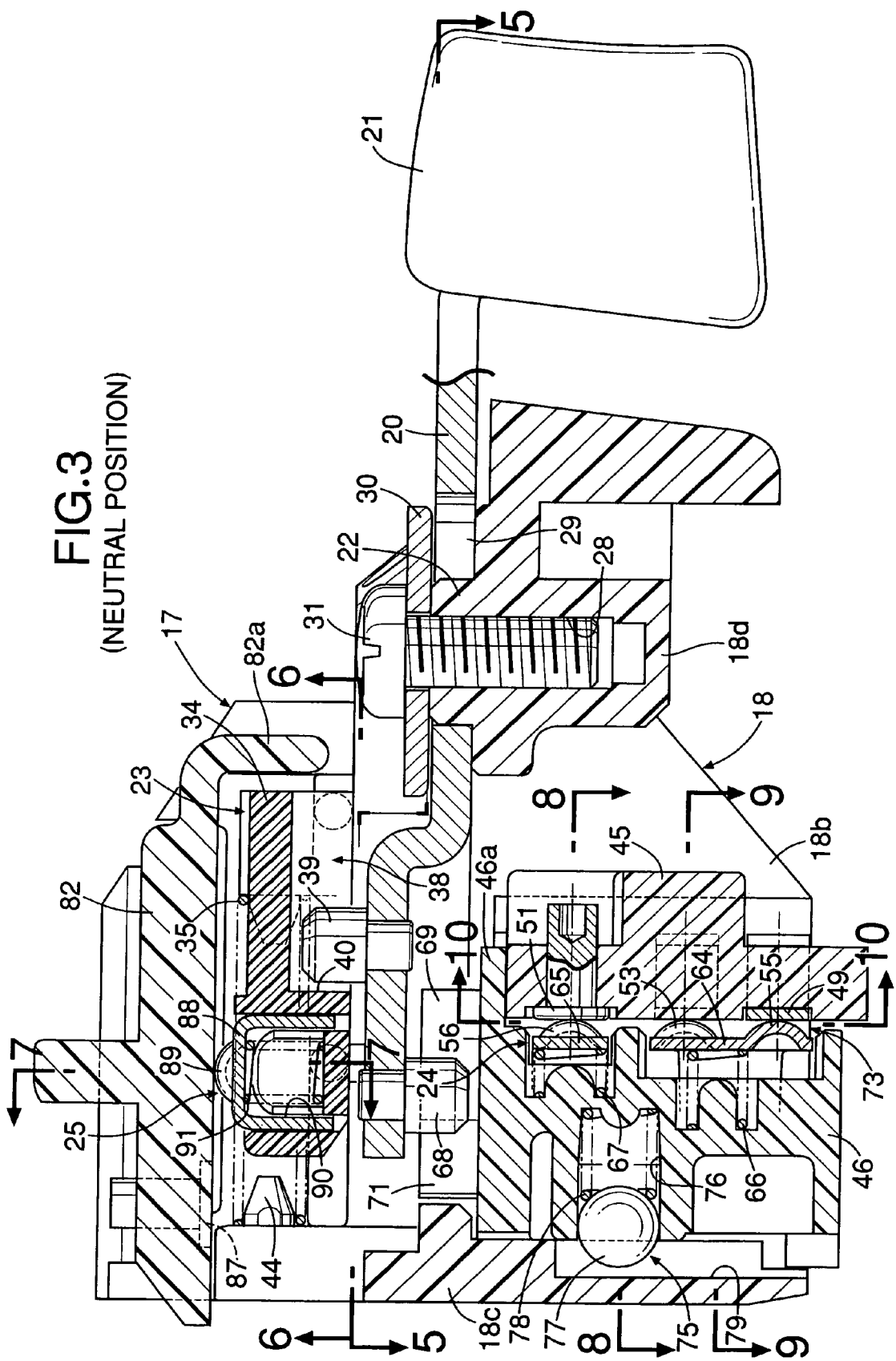
FIG. 3 is an enlarged sectional view taken along a line 3-3 in FIG. 2 when a switch operating element is in a neutral position.
Figure 4:
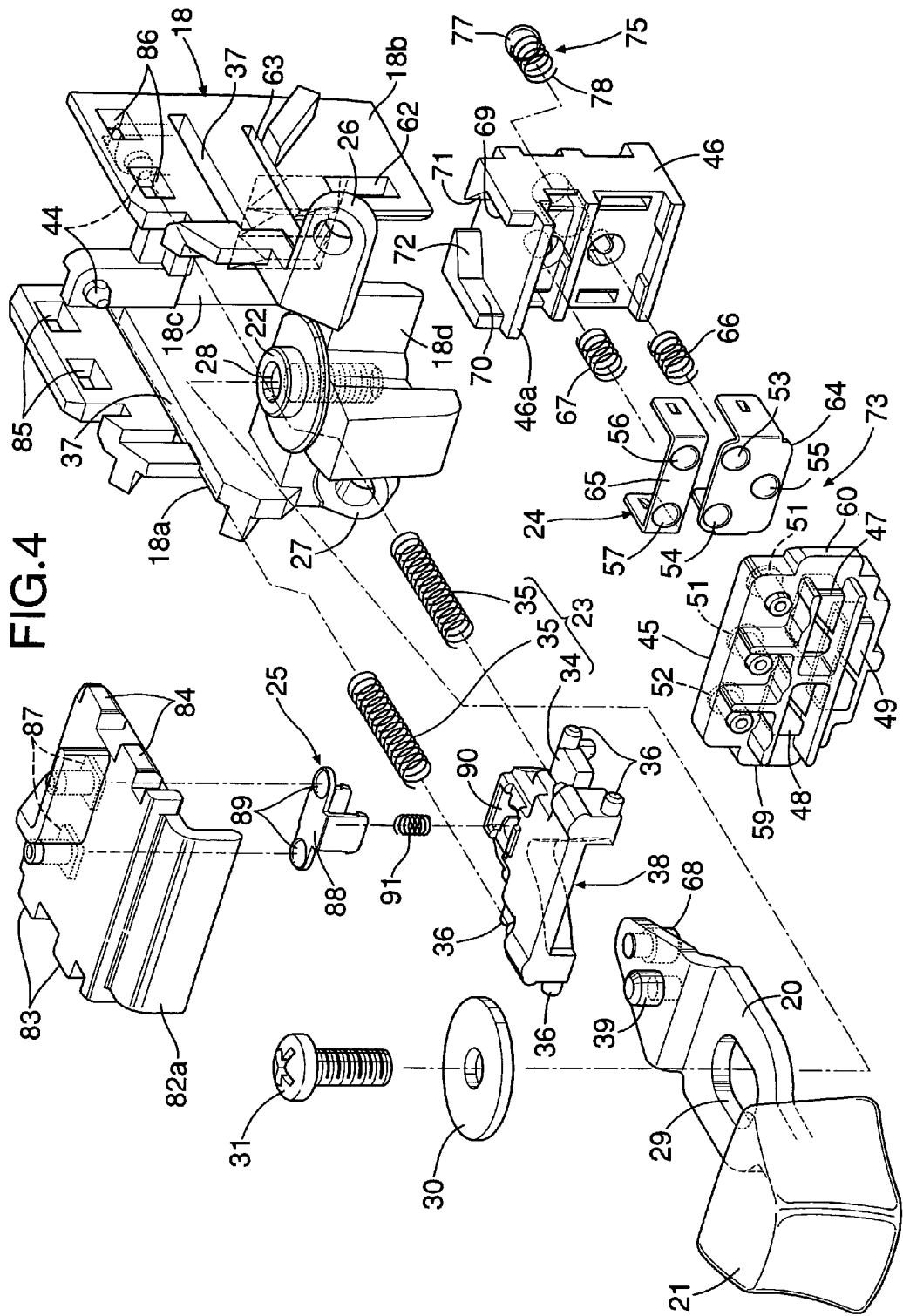
FIG. 4 is an exploded perspective view of the turn signal switch means.

Referring carefully to FIG. 3, a second pin 68 having an axis parallel to the pivot shaft 22 and the first pin 39 is provided at the end of the switch operating element 20 protruding into the switch case 18. The second pin 68 is provided on the switch operating element 20 so as to protrude from a surface of the switch operating element 20 facing the movable contact holder 46 at a position spaced away from the pivot shaft 22 more than the first pin 39. As shown in FIG. 5, first and second abutment faces 69 and 70 are provided on the movable contact holder 46 so as to extend in parallel to each other along the directions of push-in and return of the switch operating element 20, and are adapted to be positioned on opposite sides of the second pin 68 when the switch operating element 20 is in the returned position. The first and second abutment faces 69 and 70. In a state in which the switch operating element 20 is in the returned and neutral position without indicating either the left-turn or the right-turn, the first and second abutment faces 69 and 70 are equidistant from the second pin 68. When the switch operating element 20 is swung from this state to the left-turn indicating position, the second pin 68 is brought into abutment against the first abutment face 69 and slide the movable contact holder 46 to a position where the movable contact holder 46 abuts against the second sidewall 18b of the switch case 18, as shown in FIG. 11. In this state, when the switch operating element 20 is returned to the neutral position, the second pin 68 is moved into abutment against or closer to the second abutment face 70 so as not to exert an urging force on the movable contact holder 46.

In a state in which there is no indication of the left-turn or the right-turn, when the switch operating element 20 is swung to the right-turn indicating position from the returned and neutral position, the second pin 68 is brought into abutment against the second abutment face 70 and slides the movable contact holder 46 to a position where the movable contact holder 46 abuts against the first sidewall 18a of the switch case 18. In this state, when the switch operating element 20 is returned to the neutral position, the second pin 68 is moved into abutment against or closer to the first abutment face 69 so as not to exert an urging force on the movable contact holder 46.

Provided on the movable contact holder 46 are a first cam face 71 connected to the first abutment face 69 and a second cam face 72 connected to the second abutment face 70 such that they are brought into abutment against the second pin 68 when the switch operating element 20 is pushed-in to the pushed-in position from the returned position after being swung to the left-turn indicating position or the right-turn indicating position. The first and second cam faces 71 and 72 are formed so that they are inclined to become closer to each other toward the front wall 18c of the switch case 18.

When the switch operating element 20 is pushed-in to the pushed-in position after being swung to the left-turn indicating position, the second pin 68 is brought into abutment against the second cam face 72 of the movable contact holder 46 having been moved toward the second sidewall 18b of the switch case 18, and is then moved to the pushed-in position while being in sliding contact with the second cam face 72, thereby returning the movable contact holder 46 to the neutral position, as shown in FIG. 12. On the other hand, when the switch operating element 20 is pushed-in to the pushed-in position after being swung to the right-turn indicating position, the second pin 68 is brought into abutment against the first cam face 71 of the movable contact holder 46 having been moved toward the first sidewall 18a of the switch case 18, and is then moved to the pushed-in position while being in sliding contact with the first cam face 71, thereby returning the movable contact holder 46 to the neutral position. In other words, the movable contact holder 46 is operatively connected to the second pin 68 so as to be slid in response to the operation of the switch operating element 20.

As clearly shown in FIG. 8, a click mechanism 75 is mounted between the front wall 18c of the switch case 18 and the movable contact holder 46 so as to retain the position of the movable contact holder 46 which is changed corresponding to the swing and push-in movements of the switch operating element 20.

The click mechanism 75 comprises a steel ball 77, a click spring 78, a neutral-position retaining recess 79, a left-turn indicating position retaining recess 80, and a right-turn indicating position retaining recess 81. The most part of the steel ball 77 is accommodated in a bottomed accommodating bore 76 provided in the movable contact holder 46 to open toward the front wall 18c of the switch case 18. The click spring 78 is mounted between a closed end of the accommodating bore 76 and the steel ball 77 so as to exhibit a spring force for urging the steel ball 77 toward the front wall 18c. The neutral-position retaining recess 79 is provided in the front wall 18c of the switch case 18 such that a portion of the steel ball 77 is brought into engagement with the recess 79 when the movable contact holder 46 is in the neutral position. The left-turn indicating position retaining recess 80 is provided in the front wall 18c such that a portion of the steel ball 77 is brought into engagement with the recess 80 when the movable contact holder 46 is moved toward the second sidewall 18b in response to the swing of the switch operating element 20 to the left-turn indicating position. The right-turn indicating position retaining recess 81 is provided in the front wall 18c such that a portion of the steel ball 77 is brought into engagement with the recess 81 when the movable contact holder 46 is moved toward the first sidewall 18a in response to the swing of the switch operating element 20 to the right-turn indicating position.

When the movable contact holder 46 is in the neutral position, the first and second movable contacts 53 and 54 of the position switch 73 are in contact and electrical connection with the first and second stationary contacts 47 and 48; the third movable contact 55 is in contact and electrical connection with the third stationary contact 49, and the fourth and fifth movable contacts 56 and 57 of the winker switch 24 are not in contact and electrical connection with any of the fourth to sixth stationary contacts 50 to 52.

When the movable contact holder 46 is moved to the left-turn indicting position, in the position switch 73, the first and third movable contacts 53 and 55 are in contact and electrical connection with the first and third stationary contacts 47 and 49, while the second movable contact 54 is moved to a position out of contact and electrical connection with the second stationary contact 48; and in the winker switch 24, the fourth and fifth movable contacts 56 and 57 are individually in contact and electrical connection with the fourth and fifth stationary contacts 50 and 51.

When the movable contact holder 46 is moved to the right-turn indicating position, in the position switch 73, the second and third movable contacts 54 and 55 are in contact and electrical connection with the second and third stationary contacts 48 and 49, while the first movable contact 53 is moved to a position out of contact and electrical connection with the first stationary contact 47; and in the winker switch 24, the fourth and fifth movable contacts 56 and 57 are individually in contact and electrical connection with the fifth and sixth stationary contacts 51 and 52.

Further, a cover portion 46a (see FIGS. 4 and 10) is integrally provided in the movable contact holder 46 so as to cover from above a region between opposed surfaces of the movable contact holder 46 and the first stationary contact base 45.

Referring particularly carefully to FIGS. 3, 6 and 7, the set switch 25 is mounted between a second stationary contact base 82 made of a synthetic resin and fixed to the switch case 18 and the return plate 34 constituting a portion of the resiliently urging means 23.

The second stationary contact base 82 is secured to the switch case 18 so as to cover the return plate 34 from above. The second stationary contact base 82 is fixed to the switch case 18 by bringing third and fourth engaging projections 83, 83 and 84, 84 integrally projectingly provided in pairs on opposite sides of the second stationary contact base 82 into resilient engagement with third and fourth locking bores 85, 85 and 86, 86 provided in pairs in upper portions of the first and second sidewalls 18a and 18b of the switch case 18.

A pair of left and right seventh stationary contacts 87, 87 are fixed on a surface of the second stationary contact base 82 facing the return plate 34 in a portion near the front wall 18c of the switch case 18. On the other hand, a third contact plate 88 corresponding to the seventh stationary contacts 87 is supported on the return plate 34 so as to be movable toward and away from the second stationary contact base 82. A pair of sixth movable contacts 89, 89 capable of being brought into contact and electrical connection with the seventh stationary contacts 87 are projectingly provided on a surface of the third contact plate 88 opposed to the second stationary contact base 82.

The return plate 34 has a bottomed spring accommodating bore 90 which faces a rear face of the third contact plate 88. A spring 91 is mounted under compression between a closed end of the spring accommodating bore 90 and the return plate 34, and thus the return plate 34 is floatingly supported on the return plate 34.

When the switch operating element 20 is in the neutral position, the sixth movable contacts 89 are never brought into contact and electrical connection with the seventh stationary contacts 87, as shown in FIGS. 3 and 5; and also when the switch operating element 20 is in the pushed-in position, the sixth movable contacts 89 are never brought into contact and electrical connection with the seventh stationary contacts 87, as shown in FIG. 12. Therefore, when the switch operating element 20 is swung to the left or the right in the returned position, the sixth movable contacts 89 are brought into contact and electrical connection with the seventh stationary contacts 87, as shown in FIG. 11, in response to the push-in of the return plate 34 corresponding to the swing of the switch operating element 20. Thus, the amount of stroke of the return plate 34 upon the swing of the switch operating element 20 from the neutral position to the left-turn indicating position or the right-turn indicating position is larger than the amount of stroke of the return plate 34 upon the push-in of the switch operating element 20 from the returned position to the pushed-in position. Accordingly, the sixth movable contacts 89 are disposed on the return plate 34 such that they are brought into contact and electrical connection with the seventh stationary contacts 87 upon the swing of the switch operating element 20 in the returned position from the neutral position to the left-turn or right-turn indicating position, but they are not brought into contact and electrical connection with the seventh stationary contacts 87 upon the push-in of the switch operating element 20 from the returned position to the pushed-in position.

Figure 13:
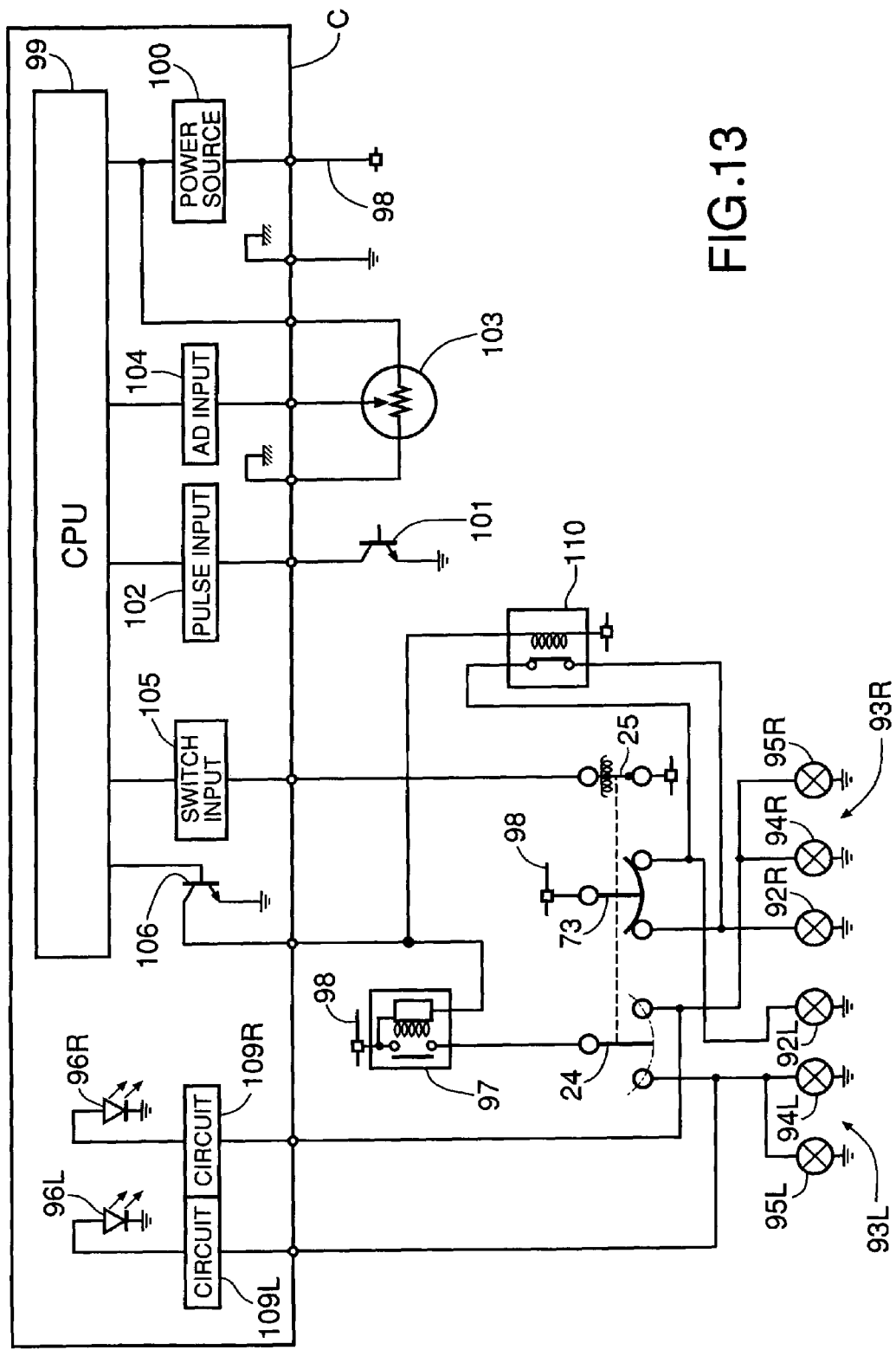
FIG. 13 is a diagram showing the arrangement of a turn signal control device for a vehicle.

Referring to FIG. 13, the winker switch 24 of the turn signal switch means 17 is interposed between a left-turn indicating means 93L and the right-turn indicating means 93R which are activated by electricity supply thereto to indicate a left-turned state and a right-turned state, and a winker relay 97 which is a flasher unit.

The left-turn indicating means 93L comprises, for example, a left front winker lamp 94L, a left rear winker lamp 95L and a left indicator lamp 96L. The fourth and fifth movable contacts 56 and 57 as well as the fourth and fifth stationary contacts 50 and 51 on the winker switch 24 are used for providing and blocking the electricity supply to the left front winker lamp 94L, the left rear winker lamp 95L and the left indicator lamp 96L. The right-turn indicating mans 93R comprises, for example, a right front winker lamp 94R, a right rear winker lamp 95R and a right indicator lamp 96R. The fourth and fifth movable contacts 56 and 57 as well as the fifth and sixth stationary contacts 51 and 52 on the winker switch 24 are used for providing and blocking the electricity supply to the right front winker lamp 94R, the right rear winker lamp 95R and the right indicator lamp 96R.

The position switch 73 is used for the control of the electricity supply to left and right position lamps 92L and 92R, wherein the second and third movable contacts 54 and 55 as well as the second and third stationary contacts 48 and 49 on the position switch 73 are used for providing and blocking the electricity supply to the left position lamp 92L, and the first and third movable contacts 53 and 55 as well as the first and third stationary contacts 47 and 49 on the position switch 73 are used for providing and blocking the electricity supply to the right position lamp 92R.

The movable contact holder 46 of the winker switch 24 is operatively connected to the second pin 68 provided on the switch operating element 20, and is adapted to be slid in response to the swing and push-in of the switch operating element 20. In this arrangement, the movable contact holder 46 can slide between a left-turn indicating/connecting position (a position on the side of the second sidewall 18b in the switch case 18), a right-turn indicating/electric connecting position (a position on the side of the first sidewall 18a in the switch case 18), and a disconnecting position provide at a central portion between the left-turn indicating/electric connecting position and the right-turn indicating/electric connecting position. In the left-turn indicating/electric connecting position, the left-turn indicating means 93L is connected to the winker relay 97 in response to the swing of the switch operating element 20 to the left-turn indicating position. In the right-turn indicating/electric connecting position the right-turn indicating means 93R is connected to the winker relay 97 in response to the swing of the switch operating element 20 to the right-turn indicating position. In the disconnecting position, the left-turn indicating means 93L and the right-turn indicating means 93R are disconnected from the winker relay 97 in response to the push-in of the switch operating element 20 after the swing of the switch operating element 20 to the left-turn or right-turn indicating position.

In addition, the position switch 73 is mounted between a power source line 98, and the left and right position lamps 92L and 92R. The left position lamp 92L and the power source line 98 are disconnected from each other in response to the sliding of the movable contact holder 46 to the left-turn indicating/electric connecting position corresponding to the swing of the switch operating element 20 to the left-turn indicating position. The right position lamp 92R and the power source line 98 are disconnected from each other in response to the sliding of the movable contact holder 46 to the right-turn indicating/electric connecting position corresponding to the swing of the switch operating element 20 to the right-turn indicating position. Both the left and right position lamps 92L and 92R are connected to the power source line 98 when the movable contact holder 46 is in the disconnecting position.

The winker relay 97 is mounted between the power source line 98 and the winker switch 24 so as to repeat the electrical connection and disconnection in response to the input of a setting signal from a control unit C, and retain the disconnected state in response to the input of a cancel signal. Thus, the winker switch 24 breaks the connection of the left-turn indicating means 93L or the right-turn indicating means 93R to the winker relay 97 in response to the push-in of the switch operating element 20 to the pushed-in position.

The control unit C includes a CPU 99, a pulse input circuit 102, an AD input circuit 104, a power source circuit 100 provided between the power source line 98 and the CPU 99, a switch input circuit 105, and a transistor 106 for controlling the electrical connection and disconnection between the winker relay 97 and a position relay 110. A signal is input from the set switch 25 to the CPU 99 through the switch input circuit 105; a pulse signal output from a vehicle speed sensor 101 is input to the CPU 99 through the pulse input circuit 102;

and an analog signal from a steering angle sensor 103 is input to the CPU 99 through the AD input circuit 104.

The control unit C also includes lighting circuits 109L and 109R provided individually corresponding to the left and right indicator lamps 96L and 96R which are light-emitting diodes, and adapted to activate one of the left and right indicator lamps 96L and 96R corresponding to the switching mode of the winker switch 24.

The position relay 110 is provided between the left and right position lamps 92L and 92R so as to be excited in response to the electrical connection of the transistor 106 to break disconnection therebetween.

The CPU 99 is adapted to integrate detection values detected by the steering angle sensor 103 in synchronization with pulses output from the vehicle speed sensor 110. When an integrated value is equal to or larger than a given value, the CPU 99 determines that motorcycle is in a cornering state; and after the end of the cornering state, when the detection value detected by the steering angle sensor 103 becomes equal to or smaller than a predetermined value, the CPU 99 determines that a predetermined automatic canceling condition is established, and then outputs a cancel signal to break the connection to the transistor 106. Thus, the winker relay 97 is disconnected, and the position relay 110 remains electrically connected. Also, the CPU 99 outputs a setting signal when the set switch 25 changes the switching modes in response to the swing of the switch operating element 20 in the returned position from the neutral position to the left-turn or right-turn indicating position and appropriately provides the electrical connection, thereby providing the electrical connection to the transistor 106. Thus, the winker relay 97 is repeatedly electrically connected and disconnected, and the position relay 110 is disconnected.

The determination on the establishment of the predetermined automatic canceling condition may be made by using a timer which counts time elapsed from the electrical connection of the set switch 25. In this arrangement, when the elapsed time has reached a predetermined time, it is determined that the predetermined automatic canceling condition has been established.

When an ignition switch (not shown) is turned on in a state in which the switch operating element 20 is in the neutral position, the CPU 99 of the control unit C provides the electrical connection to the transistor 106, whereby the winker relay 97 is repeatedly electrically connected and disconnected, the position relay 110 is disconnected, and the left and right position lamps 92L and 92R are turned on. In this state, when the switch operating element 20 is swung to the right-turn indicating position, the position switch 73 turns off the right position lamp 92R, and causes the right front winker lamp 94R, the right rear winker lamp 95R and the right indicator lamp 96R of the right indicating means 93R to blink. When the CPU 99 determines that the predetermined automatic canceling condition has been established to disconnect the transistor 106, the winker relay 97 is disconnected, and the right front winker lamp 94R, the right rear winker lamp 95R and the right indicator lamp 96R of the right indicating means 93R are turned off. Also, the electrical connection to the position relay 110 provides the electrical connection of the position switch 73 through the position relay 110 to the right position lamp 92R, thereby turning on the right position lamp 92R.

Further, when the switch operating element 20 is swung to the left-turn indicating position, the position switch 73 turns off the left position lamp 92L, conversely from the above-described case, and causes the left front winker lamp 94L, the left rear winker lamp 95L and the left indicator lamp 96L to blink. When the CPU 99 determines that the predetermined automatic canceling condition has been established to disconnect the transistor 106, the left front winker lamp 94L, the left rear winker lamp 95L and the left indicator lamp 96L of the left indicating means 93L are turned off, and the left position lamp 92L is turned on.

The operation of the first embodiment will be described below. The resiliently urging means 23 is mounted between the switch case 18 and the switch operating element 20 so as to urge the switch operating element 20 toward the neutral position and the returned position. The resiliently urging means 23 includes the return plate 34 and the pair of return springs 35, 35. The return plate 34 has the guide recess 38 at one end thereof against which the first pin 39 provided on the switch operating element 20 is adapted to abut, and is supported in the switch case 18 so as to be slidable in the direction parallel to the directions of push-in and return of the switch operating element 20. The pair of return springs 35, 35 are mounted between the return plate 34 and the switch case 18 so as to exhibit the spring forces for urging the return plate 34 in the direction to cause the first pin 39 to abut against the guide recess 38. The guide recess 38 is formed into the substantially triangular shape having the valley 40 and the pair of return cam faces 41 and 42 provided on the opposite sides of the valley 40. The first pin 39 abuts against the valley 40 in the state in which the switch operating element 20 is in the neutral position. The return cam faces 41 and 42 are inclined to bring the first pin 39 into abutment against the cam faces 41 and 42 in response to the swing of the switch operating element 20 to the left-turn and the right-turn indicating positions. Both the return springs 35 are mounted between the return plate 34 and the switch case 18 on the opposite sides of the valley 40.

With this resiliently urging means 23, when the switch operating element 20 is in the neutral position, the pair of return springs 35 brings the first pin 39 of the switch operating element 20 into abutment against the valley 40 of the guide recess 38. When the switch operating element 20 is swung to the left-turn or right-turn indicating position, the return springs 35 exhibit the spring forces for urging the switch operating element 20 in the direction to return the first pin 39 abutting against one of the return cam faces 41 and 42 provided on the opposite sides of the valley 40 to the valley 40, i.e., in the direction to return the switch operating element 20 toward the neutral position. When the switch operating element 20 is pushed-in to the pushed-in position, the return springs 35 exhibit the spring forces for urging the switch operating element 20 toward the returned position.

The return plate 34 and the pair of return springs 35 are disposed in parallel to the switch operating element 20, thereby reducing the entire length of the turn signal switch means 17 in the directions of push-in and return of the switch operating element 20. Further, the pair of return springs 35 exhibit the spring forces from the opposite sides to return the switch operating element 20 toward the neutral position, thereby inhibiting the switch operating element 20 from staggering during operation thereof, leading to an improved operational feeling.

Furthermore, the resiliently urging means 23 and the winker switch 24 are disposed within the switch case 18 with the switch operating element 20 sandwiched therebetween, thereby reducing the entire length of the turn signal switch means 17 in the directions of push-in and return of the switch operating element 20. In addition, the position of the switch operating element 20 can be changed by disposing the resiliently urging means 23 and the winker switch 24 on which side of the switch operating element 20, thereby increasing the degree of freedom in disposing the operating knob 21, which is the operating portion of the switch operating element 20, in the vertical direction.

The switch operating element 20 is provided with the first pin 39 protruding from one surface of the switch operating element 20, and the second pin 68 protruding from the other surface of the switch operating element 20 at the position spaced away from the pivot shaft 22 more than the first pin 39. The resiliently urging means 23 is disposed on one side of the switch operating element 20 so as to provide a resilient force to the first pin 39 for urging the switch operating element 20 to the neutral and returned position. The movable contact holder 46 constituting a portion of the winker switch 24 is operatively connected to the second pin 68 so as to be slid. Therefore, the distance between the second pin 68 operatively connected to the movable contact holder 46 and the pivot shaft 22 is relatively increased, and the amount of sliding of the movable contact holder 46 due to the swing of the switch operating element 20 is relatively increased, thereby securing a sufficient insulating space between the contacts of the winker switch 24. Also, the resiliently urging means 23 apply a resiliently urging force to the first pin 39 having a relatively large distance from the pivot shaft 22, thereby reducing a space required for the resiliently urging means 23 in the push-in and return directions to downsize the turn signal switch means 17, and increasing the degree of freedom in setting the operating load.

In addition, the movable contact holder 46 can slide between a left-turn indicating/connecting position, a right-turn indicating/electric connecting position, and a disconnecting position provided at a central portion between the left-turn indicating/electric connecting position and the right-turn indicating/electric connecting position. In the left-turn indicating/electric connecting position, the left-turn indicating means 93L is connected to the winker relay 97 in response to the swing of the switch operating element 20 to the left-turn indicating position. In the right-turn indicating/electric connecting position the right-turn indicating means 93R is connected to the winker relay 97 in response to the swing of the switch operating element 20 to the right-turn indicating position. In the disconnecting position, the left-turn indicating means 93L and the right-turn indicating means 93R are disconnected from the winker relay 97 in response to the push-in of the switch operating element 20 after the swing of the latter to the left-turn or right-turn indicating position. The winker switch 24 is operatively connected to the switch operating element 20 so as to break the connection of the left-turn indicating means 93L or the right-turn indicating means 93R to the winker relay 97 in response to the push-in of the switch operating element 20 to the pushed-in position. Therefore, in order to provide a winker-canceled state by a manual operation after the winker switch 24 has been operated so as to connect the left-turn indicting means 93L or the right-turn indicating means 93R to the flasher unit by swinging the switch operating element 20 in the returned position toward the left-turn indicating position or the right-turn indicating position, the switch operating element 20 is pushed-in from the returned position to the pushed-in position. With this operation, the winker switch 24, in a state in which the left-turn indicting means 93L or the right-turn indicating means 93R is connected to the winker relay 97, is operated to break the connection of the left-turn indicting means 93L or the right-turn indicating means 93R to the winker relay 97, thereby providing the winker-canceled state. Therefore, a switch and an electric circuit for manual canceling are not required to improve the reliability.

Further, in the resiliently urging means 23, the guide recess 38 provided in the return plate 34 is formed so that the amount of stroke of the return plate 34 upon the swing of the switch operating element 20 in the returned position from the neutral position to the left-turn indicating position or the right-turn indicating position is larger than the amount of stroke of the return plate 34 upon the push-in of the switch operating element 20 from the returned position to the pushed-in position. The set switch 25 comprises the seventh stationary contacts 87 fixedly disposed on the side of the switch case 18, and the sixth movable contacts 69. The sixth movable contacts 69 are disposed on the return plate 34 so that they are brought into contact and electrical connection with the seventh stationary contacts 87 upon the swing of the switch operating element 20 in the returned position from the neutral position to the left-turn or right-turn indicating position, but they are not brought into contact with the seventh stationary contacts 87 upon the push-in of the switch operating element 20 from the returned position to the pushed-in position. Thus, it is possible to construct the set switch 25 so as to provide electrical connection in response to the swing of the switch operating element 20 from the neutral position to the left-turn or right-turn indicating position, by utilizing a difference between the amount of stroke of the return plate 34 upon the push-in of the switch operating element 20 from the returned position to the pushed-in position and the amount of stroke of the return plate 34 upon the swing of the switch operating element 20 to the left-turn indicating position or the right-turn indicating position. Therefore, the set switch 25 is constructed by using, as a portion thereof, the return plate 34 constituting the return plate 34 which is a portion of the resiliently urging means 23, thereby reducing the number of parts.

Figure 14:
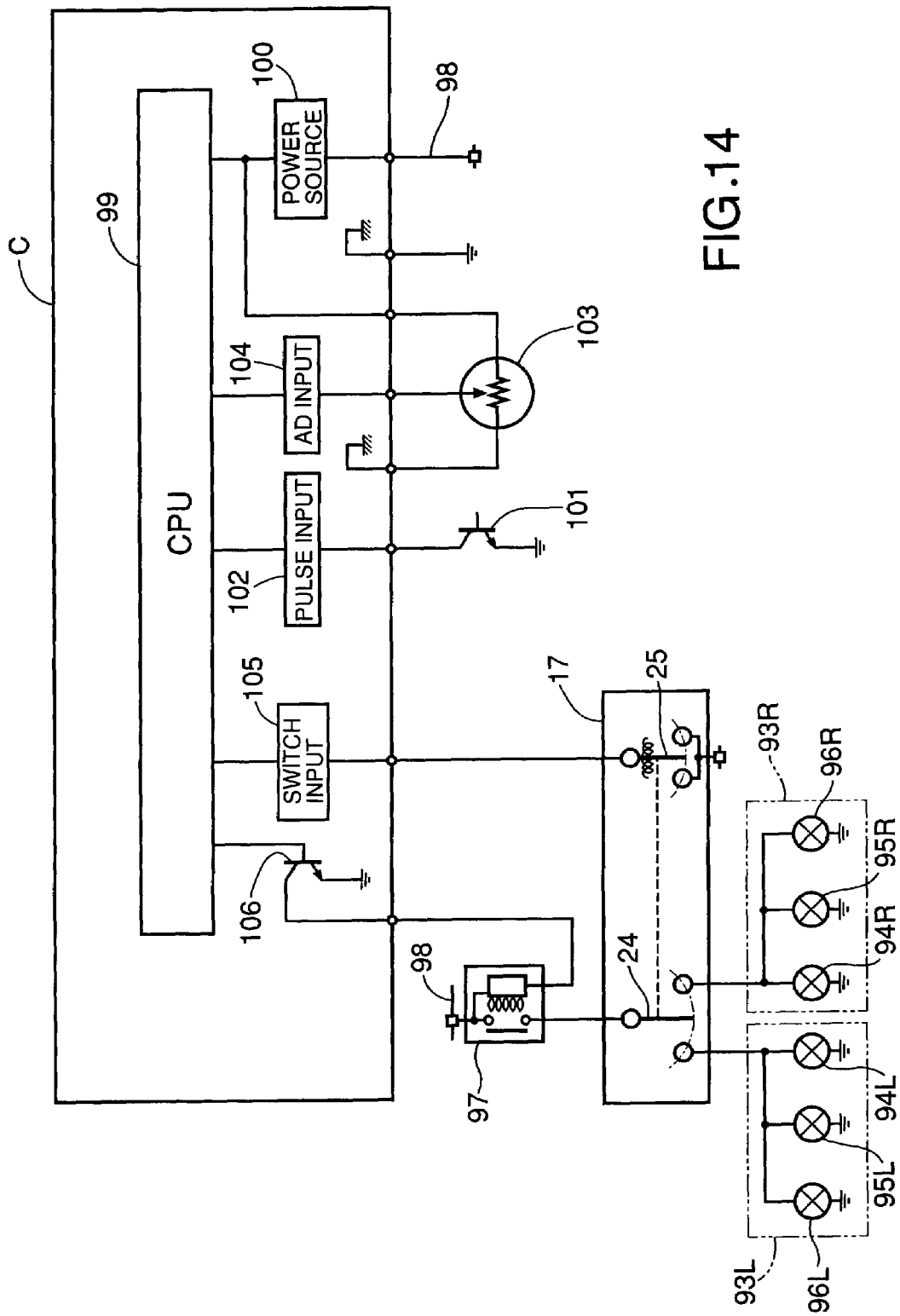
FIG. 14 is a diagram showing the arrangement a turn signal control device for a vehicle, according to a second embodiment of the present invention.

In the first embodiment, the turn signal control device including the position lamps 92L and 92R has been described, but in a second embodiment, a turn signal control device including no position lamps 92L and 92R will be described with reference to FIG. 14. In the second embodiment, portions or components corresponding to those in the first embodiment are only shown in FIG. 14 with the same reference numerals and symbols, and the detailed description thereof is omitted.

A winker relay 97 which is a flasher unit is mounted between a power source line 98 and the winker switch 24. A winker switch 24 is adapted to break the connection of the left-turn indicting means 93L or the right-turn indicating means 93R to the winker relay 97 in response to the push-in of the switch operating element 20 to the pushed-in position.

Namely, the position switch 73 and the position relay 110 in the first embodiment are not required in the second embodiment.

Also with the second embodiment, in order to provide a winker-canceled state by a manual operation after the winker switch 24 has been operated so as to connect the left-turn indicting means 93L or the right-turn indicating means 93R to the flasher unit by swinging the switch operating element 20 in the returned position toward the left-turn indicating position or the right-turn indicating position, the switch operating element 20 is pushed-in from the returned position to the pushed-in position. With this operation, the winker switch 24, in a state in which the left-turn indicting means 93L or the right-turn indicating means 93R is connected to the winker relay 97, is operated to break the connection of the left-turn indicting means 93L or the right-turn indicating means 93R to the winker relay 97, thereby providing the winker-canceled state. Therefore, a switch and an electric circuit for manual canceling are not required to improve the reliability.

Although the embodiments of the present invention have been described, the present invention is not limited to the above described embodiments, and changes in design can be made without departing from the subject matter of the present invention defined in the claims.

For example, in the above-described embodiments, the set switch 25 is constructed to change the switching modes from the disconnected state to the electrically connected state in response to the swing of the switch operating element 20 from the neutral position to the left-turn or right-turn indicating position. However, the set switch 25 may be constructed to change the switching modes from the electrically connecting state to the disconnecting state in response to the swing of the switch operating element 20 from the left-turn or right-turn indicating position to the neutral position.

What is claimed is:

1. A turn signal control device for a vehicle, comprising:
 a flasher unit for repeatedly performing connection and disconnection in response to input of a setting signal, and maintaining a disconnected state in response to input of a cancel signal;
 a left-turn indicating means and a right-turn indicating means which are activated by electricity supply thereto to indicate a left-turned state and a right-turned state, respectively;
 a turn signal switch means including:
  a switch operating element swingable between a neutral position, and a left-turn indicating position and a right-turn indicating position which are provided on opposite sides of the neutral position;
  a winker switch for connecting the left-turn indicating means or the right-turn indicating means to the flasher unit in response to swing of the switch operating element from the neutral position to the left-turn or right-turn indicating position; and
  a set switch for changing switching modes in response to the swing of the switch operating means from the neutral position to the left-turn or right-turn indicating position; and
 a control unit which inputs the cancel signal to the flasher unit in response to establishment of a predetermined automatic canceling condition, and which inputs the setting signal to the flasher unit in response to change of the switching modes of the set switch corresponding to the swing of the switch operating element,
 wherein the switch operating element is carried on a pivot shaft mounted in a fixed switch case so that the switch operating element can be returned and pushed-in between a returned position and a pushed-in position, the switch operating element being swingable at the returned position between the neutral position and the left-turn indicating position and the right-turn indicating position, the switch operating element being pushed-in to the pushed-in position by push-in operation at the returned position;
 wherein a resiliently urging means is mounted between the switch case and the switch operating element so as to resiliently urge the switch operating element toward the neutral position and the returned position; and
 wherein the winker switch is operatively connected to the switch operating element so as to break the connection of the left-turn indicating means or the right-turn indicating means to the flasher unit in response to push-in of the switch operating element to the pushed-in position.

2. The turn signal control device for a vehicle according to claim 1, wherein the resiliently urging means and the winker switch are disposed within the switch case with the switch operating element sandwiched therebetween.

3. The turn signal control device for a vehicle according to claim 1 or 2, wherein the switch operating element includes a first pin protruding from one surface of the switch operating element, and a second pin protruding from the other surface of the switch operating element at a position spaced away from the pivot shaft more than the first pin; and wherein the resiliently urging means is arranged on one side of the switch operating element so as to apply a resilient force to the first pin so that the first pin urges the switch operating element to the neutral position and the returned position; and wherein a movable contact holder having a plurality of movable contacts and constituting a portion of the winker switch is operatively connected to the second pin so that the movable contact holder can slide between a left-turn indicating/connecting position, a right-turn indicating/connecting position and a disconnecting position, the left-turn indicating means being connected to the flasher unit at the left-turn indicating/connecting position in response to the swing of the switch operating element to the left-turn indicating position, the right-turn indicating means being connected to the flasher unit at the right-turn indicating/connecting position in response to the swing of the switch operating element to the right-turn indicating position, the disconnecting position being provided at a central portion between the left-turn indicating/connecting position and the right-turn indicating/connecting position so that the movable contact holder can break the connection of the left-turn indicating means or the right-turn indicating means to the flasher unit in response to the push-in of the switch operating element after the swing of the switch operating element to the left-turn or right-turn indicating position.

4. The turn signal control device for a vehicle according to claim 3, wherein the resiliently urging means includes a return plate that has a guide recess into which the first pin is inserted and that is supported in the switch case so that the return plate can slide in a direction parallel to directions of push-in and return of the switch operating element, and a pair of return springs mounted between the return plate and the switch case so as to exhibit spring forces for urging the return plate in a direction to bring the first pin into abutment against the guide recess; wherein the guide recess is formed into a substantially triangular shape having a valley against which the first pin abuts in a state in which the switch operating element is in the neutral position, and return cam faces provided on opposite sides of the valley and inclined so that the first pin is brought into abutment against the return cam faces in response to the swing of the switch operating element to the left-turn and right-turn indicating positions; and wherein the return springs are mounted between the return plate and the switch case on the opposite sides of the valley.

5. The turn signal control device for a vehicle according to claim 4, wherein the guide recess is formed so that an amount of stroke of the return plate upon the swing of the switch operating element in the returned position from the neutral position to the left-turn indicating position or the right-turn indicating position is larger than an amount of stroke of the return plate upon the push-in of the switch operating element from the returned position to the pushed-in position; and wherein the set switch includes a stationary contact fixedly disposed on a side of the switch case and a movable contact disposed on the return plate, the movable contact being brought into contact and electrical connection with the stationary contact upon the swing of the switch operating element in the returned position from the neutral position to the left-turn or right-turn indicating position, while the movable contact are not brought into contact with the stationary contact upon the push-in of the switch operating element from the returned position to the pushed-in position.

* * * * *